US009400642B2

(12) United States Patent
Thomas et al.

(10) Patent No.: US 9,400,642 B2
(45) Date of Patent: Jul. 26, 2016

(54) SELF-UPDATING APPLICATION AGENT

(71) Applicant: McKesson Financial Holdings, Hamilton (BM)

(72) Inventors: Todd Thomas, Lester Prairie, MN (US); Jane Taves, Stillwater, MN (US); Steve Link, St. Paul, MN (US)

(73) Assignee: McKesson Financial Holdings, Hamilton (BM)

( * ) Notice: Subject to any disclaimer, the term of this patent is extended or adjusted under 35 U.S.C. 154(b) by 84 days.

(21) Appl. No.: 14/013,732

(22) Filed: Aug. 29, 2013

(65) Prior Publication Data

US 2015/0067665 A1    Mar. 5, 2015

(51) Int. Cl.
*G06F 9/44* (2006.01)
*G06F 9/445* (2006.01)
*H04M 1/725* (2006.01)
*H04L 12/24* (2006.01)
*G06F 11/14* (2006.01)

(52) U.S. Cl.
CPC .. *G06F 8/65* (2013.01); *G06F 8/60* (2013.01); *G06F 11/1433* (2013.01); *H04L 41/082* (2013.01); *H04M 1/72525* (2013.01); *H04M 2203/052* (2013.01)

(58) Field of Classification Search
CPC ............... G06F 8/65; G06F 8/61; G06F 8/71; G06F 11/1433; G06F 9/44536; G06F 3/123; G06F 8/60; Y10S 707/99954; H04M 2203/052; H04M 1/72525; H04L 41/082
See application file for complete search history.

(56) References Cited

U.S. PATENT DOCUMENTS

| | | | |
|---|---|---|---|
| 8,407,682 B2 * | 3/2013 | Reisman ................... | G06F 8/65 717/168 |
| 2004/0163081 A1 * | 8/2004 | Martwick ................ | G06F 8/65 717/168 |
| 2005/0204353 A1 * | 9/2005 | Ji .................................. | 717/168 |
| 2006/0248522 A1 * | 11/2006 | Lakshminarayanan ... | G06F 8/61 717/174 |
| 2006/0259902 A1 * | 11/2006 | Lin ........................... | G06F 8/65 717/168 |
| 2008/0301669 A1 * | 12/2008 | Rao ........................... | G06F 8/65 717/173 |
| 2009/0064124 A1 * | 3/2009 | Chung ....................... | G06F 8/65 717/168 |
| 2009/0282157 A1 * | 11/2009 | Le ............................. | G06F 8/65 709/230 |
| 2010/0318982 A1 * | 12/2010 | Lumley ................... | G06F 17/24 717/168 |

(Continued)

OTHER PUBLICATIONS

Marc Novakouski et al., Best Practices for Artifact Versioning in Service-Oriented Systems, Jan. 2012, retrieved online on Mar. 14, 2016, pp. 1-42. Retrieved from the Internet: <URL: http://www.sei.cmu.edu/reports/11tn009.pdf>.*

*Primary Examiner* — Thuy Dao
*Assistant Examiner* — Hanh T Bui
(74) *Attorney, Agent, or Firm* — Alston & Bird LLP

(57) ABSTRACT

Methods, apparatuses, and computer program products are described herein that are configured to enable a self-update. In some example embodiments, a method is provided that comprises receiving a communication from a data center update module, the communication comprising an expected agent version identifier. The method of this embodiment may also include determining whether the expected agent version identifier is equal to a current agent version identifier. The method of this embodiment may also include causing an application agent to perform a self-update in an instance in which the expected agent version identifier is not equal to a current agent version identifier.

16 Claims, 5 Drawing Sheets

(56) References Cited

U.S. PATENT DOCUMENTS

| | | | | |
|---|---|---|---|---|
| 2012/0110394 A1* | 5/2012 | Murakami | G06F 9/5072 | 714/48 |
| 2012/0117557 A1* | 5/2012 | Li | H04W 8/245 | 717/173 |
| 2012/0233700 A1* | 9/2012 | Ali-Ahmad | H04L 63/1408 | 726/25 |
| 2013/0205128 A1* | 8/2013 | Thompson | H04L 41/0813 | 713/2 |
| 2013/0283254 A1* | 10/2013 | Ocher | G06F 8/65 | 717/170 |
| 2014/0047429 A1* | 2/2014 | Gaither | G06F 8/60 | 717/170 |
| 2014/0310683 A1* | 10/2014 | McCarty | G06F 8/20 | 717/105 |

* cited by examiner

SELF-UPDATING APPLICATION AGENT

TECHNOLOGICAL FIELD

Embodiments of the present invention relate generally to a method, apparatus, and computer program product for remote application updates and in particular to causing application self-updates without user interaction.

BACKGROUND

In some examples of the software development cycle and/or the software development launch cycle, a user of software (e.g., an application, a code module or the like) may be required to identify, determine or otherwise be notified that a previously launched or otherwise provided software product has an update that may fix one or more bugs, address one or more noted shortcomings or provide additional functionality. In some cases, an update may actually take the form of a new version of the software. In such cases, the user must not only identify or somehow learn of the need for such an update, but also must cause that update to be installed. Once installed, the user may also take the action necessary to cause the update to be finalized. In some cases, such a process includes, but is not limited to, an application restart, a device restart or the like. In these examples, such extra steps or requirements result in unacceptable downtime, increased costs to the users or the like. While in other cases, because of the aforementioned drawbacks, the updates may simply not be performed.

BRIEF SUMMARY

Methods, apparatuses, and computer program products are described herein that are configured to provide a self-updating application or self-updating application agent. In some example embodiments described herein, an application may be operating remote from one or more data sources or data stores that contains application specific data. In such examples, the remote data store or the application data store may be housed at a location designed to protect the private nature of the data, such as in a financial institution or at a hospital. In such cases, the remote application may access said data using an application agent that is operating on a network that is local to or a member of the application data store. Due to the remote nature of the application and in an instance in which the application is altered, updated or the like, the application agent may also require a corresponding alteration or update to enable the application agent to continually provide access to the application data store or provide data from the application data store to the application.

In such cases and as described herein, the application update may be configured to transmit a communication to a data center update module identifying its current agent version (e.g., a current agent version identifier), the data center update module may cause a transmission of the expected agent version (e.g., an expected agent version identifier) to the application agent or both. Once a discrepancy is determined, such as the current agent version is an older version of the agent when compared to the expected agent version, the application agent may cause a self-update. Alternatively or additionally, the application agent may be instructed to cause a self-update. In either case, the application agent may then, in some examples, cause itself to be updated such that the current agent version matches the expected agent version.

In some example embodiments, a method is provided that comprises receiving a communication from a data center update module, the communication comprising an expected agent version identifier. The method of this embodiment may also include determining whether the expected agent version identifier is equal to a current agent version identifier. The method of this embodiment may also include causing an application agent to perform a self-update in an instance in which the expected agent version identifier is not equal to the current agent version identifier, wherein the application agent is remote from the data center update module and is in data communication with a secured application data store.

In further example embodiments, an apparatus is provided that includes at least one processor and at least one memory including computer program code with the at least one memory and the computer program code being configured, with the at least one processor, to cause the apparatus to at least receive a communication from a data center update module, the communication comprising an expected agent version identifier. The at least one memory and computer program code may also be configured to, with the at least one processor, cause the apparatus to determine whether the expected agent version identifier is equal to a current agent version identifier. The at least one memory and computer program code may also be configured to, with the at least one processor, cause the apparatus to cause an application agent to perform a self-update in an instance in which the expected agent version identifier is not equal to the current agent version identifier, wherein the application agent is remote from the data center update module and is in data communication with a secured application data store.

In yet further example embodiments, a computer program product may be provided that includes at least one non-transitory computer-readable storage medium having computer-readable program instructions stored therein with the computer-readable program instructions including program instructions configured to at least receive a communication from a data center update module, the communication comprising an expected agent version identifier. The computer-readable program instructions may also include program instructions configured to determine whether the expected agent version identifier is equal to a current agent version identifier. The computer-readable program instructions may also include program instructions configured to cause an application agent to perform a self-update in an instance in which the expected agent version identifier is not equal to the current agent version identifier, wherein the application agent is remote from the data center update module and is in data communication with a secured application data store.

In yet further example embodiments, an apparatus is provided that includes means for receiving a communication from a data center update module, the communication comprising an expected agent version identifier. The apparatus of this embodiment may also include means for determining whether the expected agent version identifier is equal to a current agent version identifier. The apparatus of this embodiment may also include means for causing an application agent to perform a self-update in an instance in which the expected agent version identifier is not equal to the current agent version identifier, wherein the application agent is remote from the data center update module and is in data communication with a secured application data store.

In some example embodiments, a method is provided that comprises receiving a heartbeat communication comprising a current agent version identifier from an application agent, wherein the application agent is remote from an application and is in data communication with a secured application data store. The method of this embodiment may also include determining an expected agent version identifier based on an agent artifact stored in an agent artifact data store. The method of this embodiment may also include causing the application agent to perform a self-update to an expected agent version identified by the expected agent version identifier in an instance in which the expected agent version identifier is not equal to the current agent version identifier.

In further example embodiments, an apparatus is provided that includes at least one processor and at least one memory including computer program code with the at least one memory and the computer program code being configured, with the at least one processor, to receive a heartbeat communication comprising a current agent version identifier from an application agent, wherein the application agent is remote from an application and is in data communication with a secured application data store. The at least one memory and computer program code may also be configured to, with the at least one processor, cause the apparatus to determine an expected agent version identifier based on an agent artifact stored in an agent artifact data store. The at least one memory and computer program code may also be configured to, with the at least one processor, cause the apparatus to cause the application agent to perform a self-update to an expected agent version identified by the expected agent version identifier in an instance in which the expected agent version identifier is not equal to the current agent version identifier.

In yet further example embodiments, a computer program product may be provided that includes at least one non-transitory computer-readable storage medium having computer-readable program instructions stored therein with the computer-readable program instructions including program instructions configured to receive a heartbeat communication comprising a current agent version identifier from an application agent, wherein the application agent is remote from an application and is in data communication with a secured application data store. The computer-readable program instructions may also include program instructions configured to deteuiline an expected agent version identifier based on an agent artifact stored in an agent artifact data store. The computer-readable program instructions may also include program instructions configured to cause the application agent to perform a self-update to an expected agent version identified by the expected agent version identifier in an instance in which the expected agent version identifier is not equal to the current agent version identifier.

In yet further example embodiments, an apparatus is provided that includes means for receiving a heartbeat communication comprising a current agent version identifier from an application agent, wherein the application agent is remote from an application and is in data communication with a secured application data store. The apparatus of this embodiment may also include means for determining an expected agent version identifier based on an agent artifact stored in an agent artifact data store. The apparatus of this embodiment may also include means for causing the application agent to perform a self-update to an expected agent version identified by the expected agent version identifier in an instance in which the expected agent version identifier is not equal to the current agent version identifier.

BRIEF DESCRIPTION OF THE DRAWINGS

Figure 1:
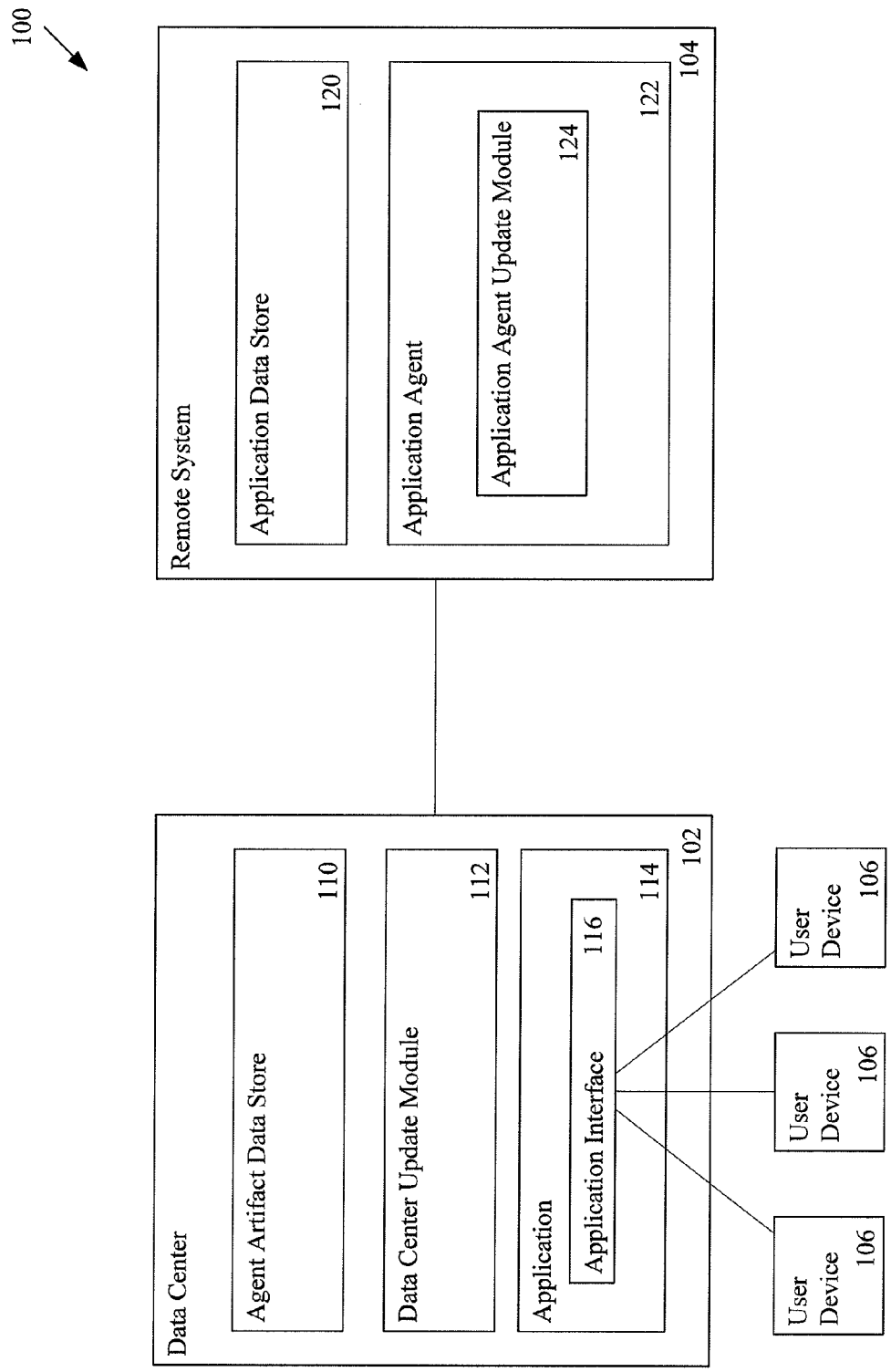
Figure 2:
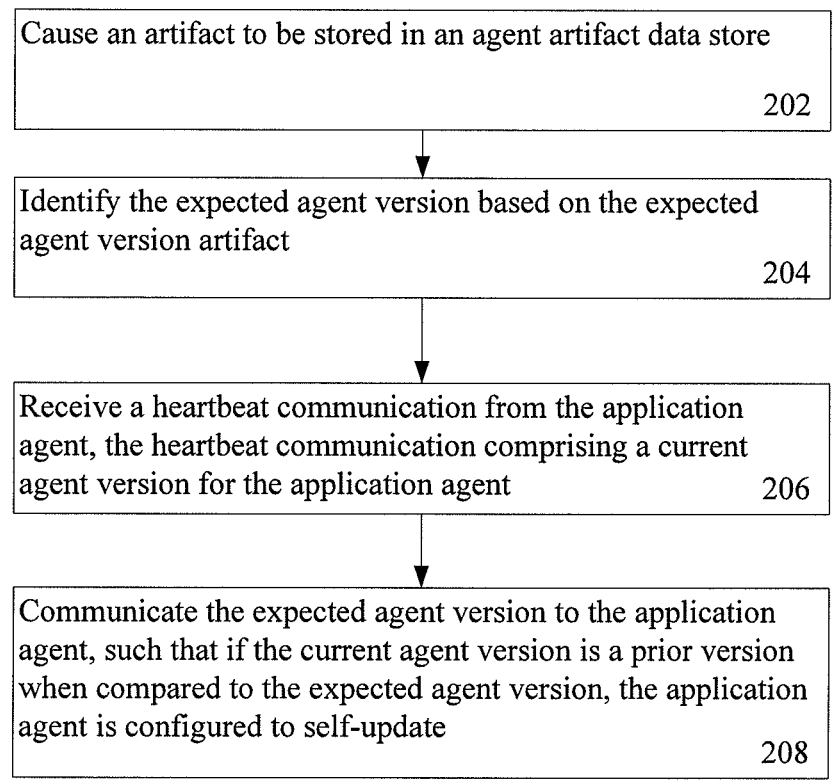
Figure 3:
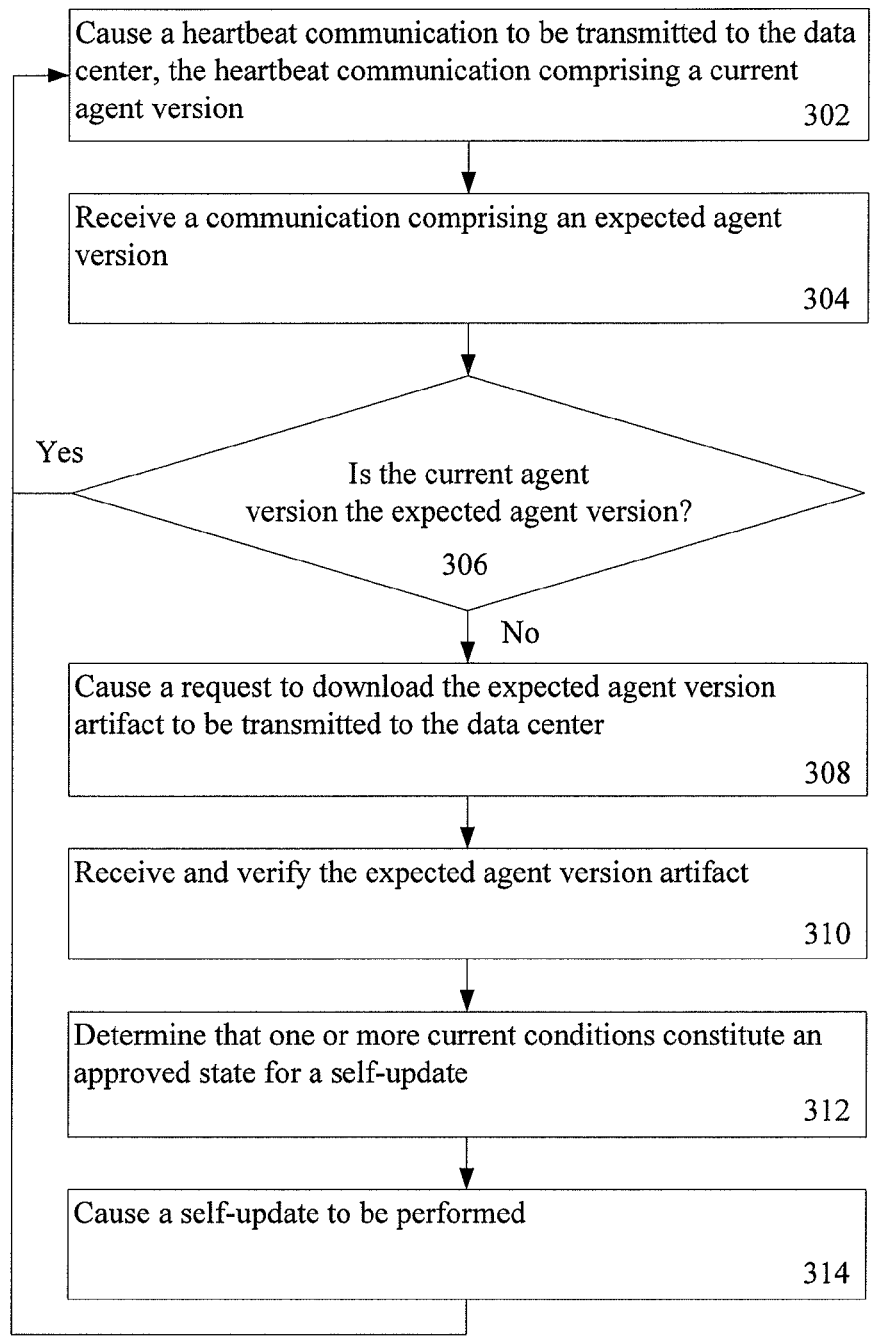
Figure 4:
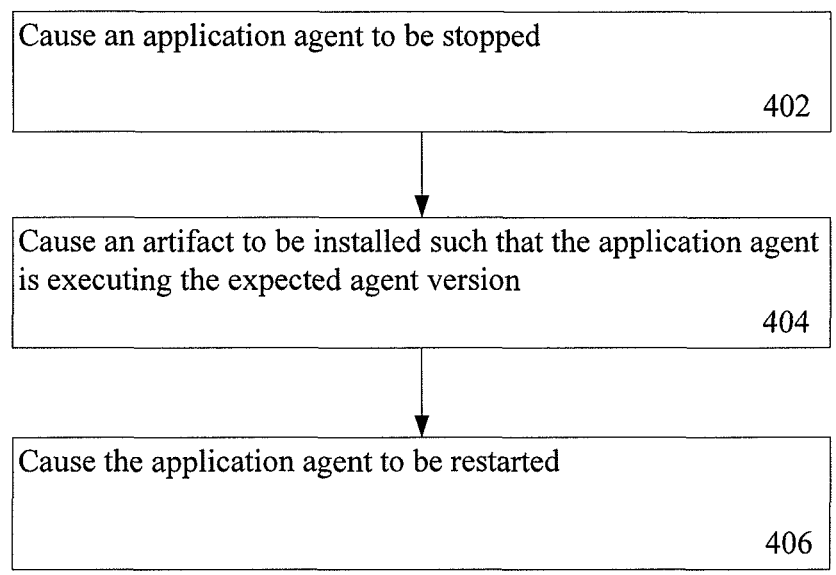
Figure 5:
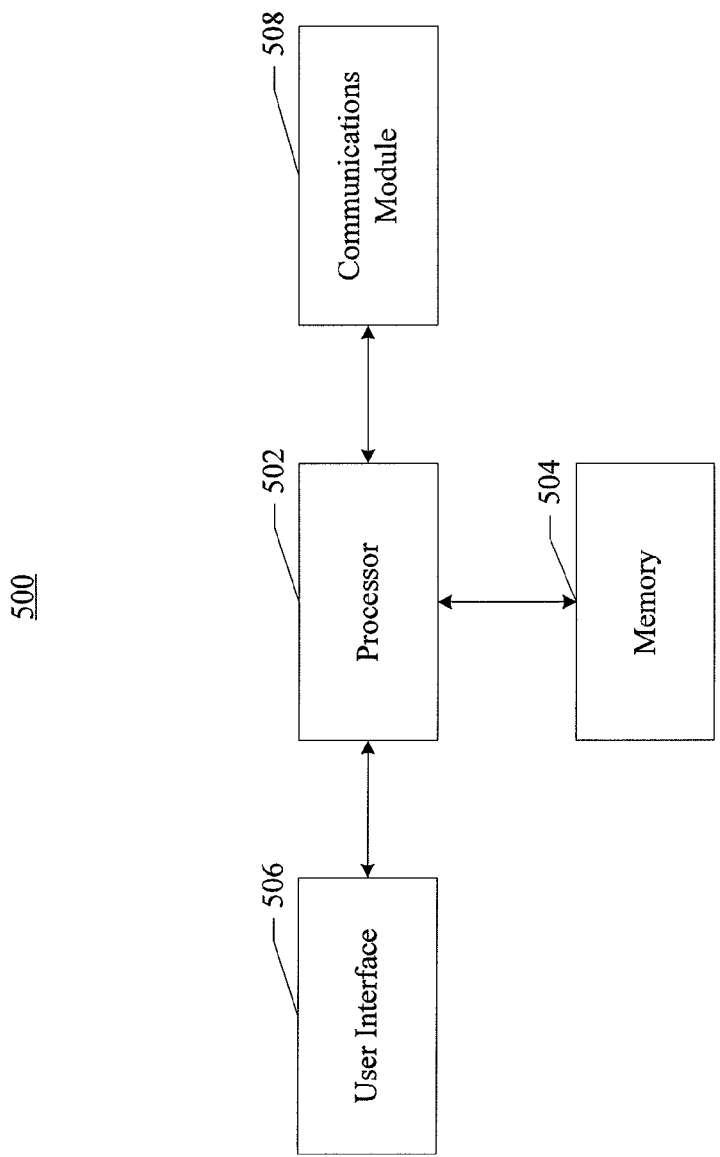

Having thus described embodiments of the invention in general terms, reference will now be made to the accompanying drawings, which are not necessarily drawn to scale, and wherein:

FIG. 1 is a schematic representation of a remote software update environment that may benefit from some example embodiments of the present invention;

FIG. 2 illustrates a flow diagram that may be performed by an apparatus that embodies a data center update module in accordance with some example embodiments of the present invention;

FIGS. 3 and 4 illustrate flow diagrams that may be performed by an apparatus that embodies an application agent and/or an application update module in accordance with some example embodiments of the present invention; and FIG. 5 illustrates a block diagram of an apparatus that embodies a policy manager in accordance with some example embodiments of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In some examples, software or applications may be delivered to users via a delivery model that is generally referred to as Software as a Service (SaaS). In some examples SaaS is referred to as "on-demand software" supplied by software vendors or application service providers and generally takes the form of a software delivery model in which software is centrally hosted on the cloud or in a remote location, such as a remote data center comprising a plurality of servers. In traditional SaaS models, application data would also be hosted on the cloud or in a remote location.

In some examples of SaaS, the application or the application interface may be accessible to a user or group of users, another application or program using a portal, interface or the like. The portal or interface may be found on an Internet page, an intranet page, be an application that is configured to be in data communication with the application over a network or the like. For example, a scheduling application may be accessed via an Internet page using a logon credentials. In some examples, however, the hosted or remote application may need to access or otherwise interact with data that is protected behind a firewall or is otherwise secured and not readily accessible.

In some examples, such data may be legacy data or may be data that was stored locally when the software was also stored and executed locally (e.g., prior to adopting the SaaS model). However, in other examples, the data may be required to be stored in a secured location or on a secured network based on privacy laws and/or the like.

One method of communicating with a secured data store or a data store operating behind a firewall, operating on a private network or the like, is to install an application agent behind the firewall, on the private network or that is otherwise configured to access the application data store. In such cases, the application agent is therefore configured to operate as a conduit of data between the application data store and the application itself. For example, in a health care example, patient data and patient scheduling data may be retained on a hospital network or within a health care network. In such cases, a remote SaaS scheduling application may be configured to access the locally stored patient data and scheduling systems using the application agent.

One particular feature of a SaaS or similar solution is the lack of maintenance for the user. Unlike traditional software delivery models that require a user to upgrade, update or purchase new versions as they were released (e.g., require a user to take some action to cause an update), SaaS is hosted software that is updated at the remote data center and therefore the update generally occurs without the knowledge of the user and without the aforementioned inconvenience. In other words, each time the user accesses the SaaS application via the application interface, in some examples, the application is generally operating the most recent or the most preferred version. However, while the SaaS application itself may be updated at the data center or on the cloud, the application agent generally still requires physically updating by the user for the application agent to function with the application itself (e.g., updates to the type of data requested, updates to the manner in which updates are written to the application data center, and/or the like).

As such, the methods, apparatus and computer program product described herein are configured to cause an application, an application agent or the like to self-update with little or no interaction by a user. In some example embodiments, the application agent may be configured to provide periodic (e.g., one per minute, once per hour or the like) heartbeat transmissions to the data center. In said heartbeat messages, the application agent may notify the data center or the data center update module of its current version or current agent version (e.g., current agent version identifier). The data center update module may be configured to respond with the expected agent version (e.g., expected agent version identifier), or may, in some examples, respond with an indication that an update is necessary. Upon receipt of the expected agent version identifier, the application agent may determine that an update is needed. Alternatively, the application agent may receive an indication from the data center update module that an update is needed. In such cases, the application agent may retrieve and install the update (e.g., an artifact) thereby causing the application agent to run the expected agent version.

FIG. 1 is an example block diagram of example components of an example remote software update environment 100. In some example embodiments, the remote software update environment 100 comprises one or more data centers 102, one or more remote systems 104 and one or more user devices 106. In some example embodiments, the data center 102 is configured to take the form of one or more remote data centers that are configured to host an application, such as a SaaS application, that is accessible by one or more user devices 106 via an application interface, such as application interface 116. In some example embodiments, the remote system 104 may be a single location or multiple locations, but is generally defined as being part of a private network, local network or the like and embodies and/or otherwise is in data communication with the data center 102. In some examples, the application agent may be installed on a remote system 104 already having access to or otherwise embodying the application data store.

In some example embodiments, the data center 102 is configured to comprise an agent artifact data store 110, a data center update module 112, an application 114 and an application interface 116. The components of the data center 102 are configured to provide various logic (e.g., code, instructions, functions, routines and/or the like) and/or services related to the provision of the application to the one or more user devices 106 and the provision of application agent updates to the application agent 122.

In some example embodiments, the agent artifact data store 110 is configured to store the expected agent version artifact (e.g., one of many kinds of tangible by-products produced during the development of software such as, but not limited to executables, dynamically linked lists, released code, code libraries, use cases, class diagrams, and other UML models, requirements and design documents). In some examples, the agent artifact data store may be configured to store a plurality of artifacts related to the application or other related applications. In some examples, the data center update module 112 is configured to monitor, access or otherwise determine the expected agent version and the current application version that is being run or should be run by the application agent. The data center update module is 112 is configured to cause, inform or otherwise indicate to the application agent 122 to perform a self-update. The application interface 116 is configured to provide an interface to the application 114, such as a scheduling application that is remotely hosted, being offered as SaaS or the like. The application interface 116 is configured to be in data communication with the one or more user devices 106.

The remote system 104 may comprise an application data store 120, an application agent 122 and an application agent update module 124. The components of the remote system 104 are configured to provide various logic (e.g., code, instructions, functions, routines and/or the like) and/or services related to the provision of the application agent 122 that is itself configured to function as the conduit between the application and the application data store 120.

As is described above, the application data store 120 may be the repository for the data used by the application. For example and in an instance in which the application is a scheduling application, the application data store 120 may contain scheduling data and records data for one or more patients. This application data in the application data store 120 may comprise private health data that cannot be released to or otherwise stored at the data center. As such, the application data store may be remote from the application itself and may, in some examples, may be locally housed behind a firewall.

The application agent 122 is configured to function as the conduit, proxy, robot or other software module that is configured to operate behind a firewall and remain in at least periodic data communication with the application and the application data store. The application agent 122 may be configured to be in data communication with the application data store 120 on behalf of the application. In some cases, the application may communicate via the application agent 122 to cause scheduling information to be stored in the application data store 120. Likewise the application may retrieve scheduling or patient data from the application data store 120 via the application agent 122. In some examples, the application agent 122 functions or is otherwise enabled to communicate with the application data store in an instance in which the application cannot directly communicate with the application data store 120. Alternatively or additionally, the application agent 122 may also be used for software testing purposes, application data store updates, application data store access and/or the like.

In some example embodiments, application agent update module 124 may be embodied be the application agent 122 or may function independently of application agent 122 to cause application agent 122 to be updated. In some examples, the application agent update module 124 may determine or otherwise be instructed that an update is available and cause the application agent 122 to be updated. The process of updating application agent 122 is further described with reference to FIGS. 3 and 4.

FIGS. 2-4 illustrate example flowcharts of the operations performed by an apparatus, such as computing system 500 of FIG. 5 embodied by a mobile device or a workstation, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 504 of an apparatus employing an embodiment of the present invention and executed by a processor 502 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2-4, when executed, convert a computer or processing circuitry into a particular machine configured to perform an example embodiment of the present invention. Accordingly, the operations of FIGS. 2-4 define an algorithm for configuring a computer or processor, to perform an example embodiment. In some cases, a general purpose computer may be provided with an instance of the processor which performs the algorithm of FIGS. 2-4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, certain ones of the operations herein may be modified or further amplified as described herein. Moreover, in some embodiments additional optional operations may also be included. It should be appreciated that each of the modifications, optional additions or amplifications described herein may be included with the operations herein either alone or in combination with any others among the features described herein.

FIG. 2 illustrates a flow diagram that may be performed by an apparatus that embodies a data center update module in accordance with some example embodiments of the present invention. In some examples of FIG. 2, the data center update module 112, in conjunction with the agent artifact data store 110, may be configured to cause, directly or indirectly, the self-update of the application agent 122.

In some examples embodiments, a new version of the application agent software may be created in a software bundle (e.g., artifact) and said artifact may be given a version number, such as an expected agent version, that is unique to that particular artifact. This new artifact may then be communicated to the data center 102. As is shown in operation 202, an apparatus, such as the computing system 500, may include means, such as data center 102, the data center update module 112, the processor 502, or the like, for causing an artifact to be stored in an agent artifact data store. In some examples, the artifact may be stored in the agent artifact data store 110 based on a maintenance script, stage-agent script and/or the like.

As is shown in operation 204, an apparatus, such as the computing system 500, may include means, such as data center 102, the data center update module 112, the processor 502, or the like, for identifying the expected agent version based on the expected agent version artifact. In some examples, the version number of the artifact stored in the agent artifact data store becomes the expected agent version or expected agent version identifier.

As is shown in operation 206, an apparatus, such as the computing system 500, may include means, such as data center 102, the data center update module 112, the processor 502, or the like, for receiving a heartbeat communication from the application agent, the heartbeat communication comprising a current agent version for the application agent. Alternatively or additionally, the computing system 500, may include means, such as data center 102, the data center update module 112, the processor 502, or the like may be configured to determine the current agent version based on update history, connection to the agent or the like.

As is shown in operation 208, an apparatus, such as the computing system 500, may include means, such as data center 102, the data center update module 112, the processor 502, or the like, for communicating the expected agent version to the application agent, such that if the current agent version is a prior version when compared to the expected agent version, the application agent is configured to self-update. Alternatively or additionally, the application agent may be caused to self-update, such as by causing the transmission and/or execution of an update script or the like.

FIG. 3 illustrates a flow diagram that may be performed by an apparatus that embodies an application agent and/or an application update module in accordance with some example embodiments of the present invention. In some examples, the application agent may be in periodic contact (e.g., every minute, every 30 minutes, every hour, every day or the like) with the application, such as via the heartbeat communication. As is shown in operation 302, an apparatus, such as the computing system 500, may include means, such as remote system 104, the application agent 122, the application agent update module 124, the processor 502, or the like, for causing a heartbeat communication to be transmitted to the data center. In some examples, the heartbeat communication comprises a current agent version. The current agent version or current agent version identifier identifies the version of the agent that the application agent is currently running.

In response to the communication or independent from the communication in operation 302, the application agent may receive a communication from the data center, the data center update module, the application or the like. The communication may, in some examples, take the form of an acknowledgement (ACK) message. As is shown in operation 304, an apparatus, such as the computing system 500, may include means, such as remote system 104, the application agent 122, the application agent update module 124, the processor 502, or the like, for receiving a communication comprising an expected agent version. The expected agent version or expected agent version identifier identifies the version of the agent that the application agent should be running.

As is shown in decision operation 306, an apparatus, such as the computing system 500, may include means, such as remote system 104, the application agent 122, the application agent update module 124, the processor 502, or the like, for determining if the current agent version is the expected agent version. In an instance in which the current agent version is the expected agent version, the process loops back to operation 302 and waits to cause the transmission of a next heartbeat communication. As is described herein, the transmission of the heartbeat message is based on a predetermined periodic time interval.

In an instance in which the current agent version does not match the expected agent version, such as when the current agent version is an older version or different version, then, as is shown in operation 308, an apparatus, such as the computing system 500, may include means, such as remote system 104, the application agent 122, the application agent update module 124, the processor 502, or the like, for causing a request to download the expected agent version artifact to be transmitted to the data center. In some examples, the application agent, the application agent update module or the like sends a download request (e.g., uniform resource location or the like) to the data center to request the artifact related to the expected agent version. Other methods of causing a download may be used in other embodiments of the methods, apparatus and computer program product described herein.

As is shown in operation 310, an apparatus, such as the computing system 500, may include means, such as remote system 104, the application agent 122, the application agent update module 124, the processor 502, or the like, for receiving and verifying the expected agent version artifact. In some examples, the artifact and any related vital information to the update process is stored or otherwise made accessible. In some examples, the application agent, the application agent update module or the like is configured to verify that the artifact is complete and that the received artifact matches the vital information (e.g., checksum, filesize or the like).

As is shown in operation 312, an apparatus, such as the computing system 500, may include means, such as remote system 104, the application agent 122, the application agent update module 124, the processor 502, or the like, for determining that one or more current conditions constitute an approved state for a self-update. In some examples, the application agent may be stopped at a pre-arranged time, such as during the night or early morning hours in which there is limited use of the application agent. In other examples, the application agent may learn a stop time based on one or more computational learning methods. In yet further examples, the application agent may monitor usage and cause itself to be stopped when its usage falls below a certain threshold and/or the like.

As is shown in operation 314, an apparatus, such as the computing system 500, may include means, such as remote system 104, the application agent 122, the application agent update module 124, the processor 502, or the like, for causing a self-update to be performed. Further description of the self-update process is described with reference to FIG. 4.

After the completion of operation 314, the process loops back to operation 302 and waits to cause the transmission of a next heartbeat communication.

FIG. 4 illustrates a flow diagram that may be performed by an apparatus that embodies an application update module in accordance with some example embodiments of the present invention. As is shown in operation 402, an apparatus, such as the computing system 500, may include means, such as remote system 104, the application agent update module 124, the processor 502, or the like, for causing an application agent to be stopped. As is shown in operation 404, an apparatus, such as the computing system 500, may include means, such as remote system 104, the application agent update module 124, the processor 502, or the like, for causing the update to be installed such that the application agent is executing or otherwise running the expected agent version. In some examples, the update process may include, but is not limited to saving and/or reusing a current configuration of the application agent, causing a Java update, causing a Tomcat update, extracting the content from the artifact, copying the extracted update-related scripts for use, executing the scripts to cause the update and/or the like.

As is shown in operation 406, an apparatus, such as the computing system 500, may include means, such as remote system 104, the application agent update module 124, the processor 502, or the like, for causing the application agent to be restarted. In some examples, after the update is installed and verified, the application agent is reactivated and continues to perform its various functions.

FIG. 5 is an example block diagram of an example computing device for practicing embodiments of an example criteria builder application. In particular, FIG. 5 shows a computing system 500 that may be utilized to implement any one of a data center 102, a remote system 104, an agent artifact data store 110, a data center update module 112, an application 114, an application interface 116, an application data store 120, an application agent 122, and application agent update module 124, a user device 106 and/or the like hereinafter referred to as "computing elements." One or more general purpose or special purpose computing systems/devices may be used to implement one or more of the computing elements. In addition, the computing system 500 may comprise one or more distinct computing systems/devices and may span distributed locations. In some example embodiments, one or more of the computing elements may be configured to operate remotely via the network. In other example embodiments, a pre-processing module or other module that requires heavy computational load may be configured to perform that computational load and thus may be on a remote device or server. For example, one or more of the computing elements may be accessed remotely. In other example embodiments, the one or more of the computing elements may be accessed locally. Furthermore, each block shown may represent one or more such blocks as appropriate to a specific example embodiment. In some cases one or more of the blocks, to include the blocks of FIG. 1, may be combined with other blocks. Also, the one or more of the computing elements may be implemented in software, hardware, firmware, or in some combination thereof to achieve the capabilities described herein.

In the example embodiment shown, computing system 500 comprises a computer memory ("memory") 504, one or more processors 502, input/output devices (e.g., keyboard, mouse, CRT or LCD display, touch screen, gesture sensing device and/or the like), other computer readable media, a display, a user interface 506, and communications module 508. The processor 502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 5 as a single processor, in some embodiments the processor 502 comprises a plurality of processors. The plurality of processors may be in operative communication with each other and may be collectively configured to perform one or more functionalities of the criteria builder application as described herein.

The one or more of the computing elements may reside in the memory 504. The memory 504 may comprise, for example, transitory and/or non-transitory memory, such as volatile memory, non-volatile memory, or some combination thereof. Although illustrated in FIG. 5 as a single memory, the memory 504 may comprise a plurality of memories. The plurality of memories may be embodied on a single computing device or may be distributed across a plurality of computing devices collectively configured to function as the application. In various example embodiments, the memory 504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, and/or some or all of the components of the one or more of the computing elements may be stored on and/or transmitted over the other computer-readable media. The components of the one or more of the computing elements preferably execute on one or more processors 502 and are configured to enable operation of the software update environment, as described herein.

Alternatively or additionally, other code or other programs (e.g., an administrative interface, one or more application programming interface, a Web server, and the like) and potentially other data repositories also may reside in the memory 504, and preferably execute on one or more processors 502. Of note, one or more of the components in FIG. 5 may not be present in any specific implementation. For example, some embodiments may not provide other computer readable media or a display.

The one or more of the computing elements is further configured to provide functions such as those described with reference to FIG. 1. The one or more of the computing elements may interact, via the network and the communications module 508, with remote data sources, third-party content and/or other content or data. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In this regard, the communications module 508 may be capable of operating with one or more air interface standards, communication protocols, modulation types, access types, and/or the like.

In an example embodiment, components/modules of the one or more of the computing elements are implemented using standard programming techniques. For example, the one or more of the computing elements may be implemented as a "native" executable running on the processor 502, along with one or more static or dynamic libraries. In other embodiments, the one or more of the computing elements may be implemented as instructions processed by a virtual machine that executes as one of the other programs. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the one or more of the computing elements, such as by using one or more application programming interfaces can be made available by mechanisms such as through application programming interfaces (API) (e.g., C, C++, C#, Objective C and Java); libraries for accessing files, databases, or other data repositories; through scripting languages such as XML; or through Web servers, FTP servers, or other types of servers providing access to stored data. Other data sources may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the one or more of the computing elements may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices (CPLDs), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a communication from a data center update module, the communication comprising an expected agent version identifier;
   determining, using a processor, whether the expected agent version identifier is equal to a current agent version identifier;
   determining whether one or more current conditions constitute an approved state for a self-update, wherein the approved state comprises an instance in which an applicant agent usage satisfies a predetermined threshold;
   causing a request to download an expected agent version artifact based on the expected agent version identifier to be transmitted to the data center update module;
   causing an application agent to perform the self-update in an instance in which the expected agent version identifier is not equal to the current agent version identifier and the one or more current conditions constitute an approved state, wherein the application agent is remote from the data center update module and an application, wherein the application agent and a secured application data store are inside a firewall when compared to the data center update module and the application, and wherein the application agent executing inside the firewall enables bidirectional communication between the application executing outside of the firewall and the secured application data store executing inside the firewall;
   causing the application agent to be stopped;
   causing the expected agent version artifact to be installed such that the application agent has an updated current agent version identifier that is equal to the expected agent version identifier; and
   causing the application agent to be restarted.

2. A method according to claim 1, further comprising:
   causing a heartbeat communication comprising the current agent version identifier to continue to be transmitted to the data center update module in an instance in which the expected agent version identifier is equal to the current agent version identifier.

3. A method according to claim 2, wherein the heartbeat communication is a periodic communication.

4. A method according to claim 1, further comprising:
   receiving and verifying the expected agent version artifact.

5. A method according to claim 1, further comprising:
   causing a heartbeat communication comprising the current agent version identifier to continue to be transmitted according to a periodic schedule in an instance in which the application agent is restarted.

6. A method according to claim 1, wherein the secured application data store comprises secured health related patient data.

7. An apparatus comprising:
   at least one processor; and
   at least one memory including computer program code, the at least one memory and the computer program code configured to, with the at least one processor, cause the apparatus to at least:
   receiving a communication from a data center update module, the communication comprising an expected agent version identifier;
   determining, using a processor, whether the expected agent version identifier is equal to a current agent version identifier;
   determining whether one or more current conditions constitute an approved state for a self-update, wherein the approved state comprises an instance in which an applicant agent usage satisfies a predetermined threshold;
   causing a request to download an expected agent version artifact based on the expected agent version identifier to be transmitted to the data center update module:
   causing an application agent to perform the self-update in an instance in which the expected agent version identifier is not equal to the current agent version identifier and the one or more current conditions constitute an approved state, wherein the application agent is remote from the data center update module and an application, wherein the application agent and a secured application data store are inside a firewall when compared to the data center update module and the application, and wherein the application agent executing inside the firewall enables bidirectional communication between the application executing outside of the firewall and the secured application data store executing inside the firewall;
   causing the application agent to be stopped;
   causing the expected agent version artifact to be installed such that the application agent has an updated current agent version identifier that is equal to the expected agent version identifier; and
   causing the application agent to be restarted.

8. A apparatus according to claim 7, wherein the at least one memory and the computer program code are further configured to, with the at least one processor, cause the apparatus to:
   cause a heartbeat communication comprising the current agent version identifier to continue to be transmitted to the data center update module in an instance in which the expected agent version identifier is equal to the current agent version identifier.

9. A apparatus according to claim 8, wherein the heartbeat communication is a periodic communication.

10. A apparatus according to claim 7, wherein the at least one memory and the computer program code are further configured to, with the at least one processor, cause the apparatus to:
receive and verifying the expected agent version artifact.

11. A method comprising:
receiving a heartbeat communication comprising a current agent version identifier from an application agent, wherein the application agent is remote from the data center update module and an application, wherein the application agent and a secured application data store are inside a firewall when compared to the data center update module and the application, and wherein the application agent executes inside the firewall and enables bidirectional communication between the application that executes outside of the firewall and the secured application data store that executes inside the firewall;
determining, using a processor, an expected agent version identifier based on an agent artifact stored in an agent artifact data store;
causing a request to download an expected agent version artifact based on the expected agent version identifier to be transmitted to the data center update module;
causing the application agent to perform a self-update to an expected agent version identified by the expected agent version identifier in an instance in which the expected agent version identifier is not equal to the current agent version identifier and in an instance in which the applicant agent usage satisfies a predetermined threshold;
causing the application agent to be stopped;
causing the expected agent version artifact to be installed such that the application agent has an updated current agent version identifier that is equal to the expected agent version identifier; and
causing the application agent to be restarted.

12. A method according to claim 11, further comprising:
causing the agent artifact to be stored in the agent artifact data store.

13. A method according to claim 11, wherein the secured application data store comprises secured health related patient data.

14. A method according to claim 11, wherein the application agent is behind a firewall when compared to a remote application, wherein the application agent enables communication between an application and the secured application data store.

15. A method according to claim 11, wherein the heartbeat communication is a periodic communication.

16. A method according to claim 11, further comprising:
receiving a request to download an expected agent version artifact based on the expected agent version identifier to be transmitted from the application agent; and
causing the download of the expected agent version artifact such that the self-update is caused to be performed by the application agent.

* * * * *